United States Patent [19]
Shih et al.

[11] Patent Number: 5,856,811
[45] Date of Patent: Jan. 5, 1999

[54] VISUAL DISPLAY AND HELMET ASSEMBLY

[75] Inventors: I-Fu Shih, Los Alamitos; Ning Wu, Rancho Palos Verdes; David E. Schnelker, Agoura Hills; Jerome Robert Laskowski, Newbury Park, all of Calif.; Ronald Kent Reger, Carmel, Ind.; Francine Harriet Landau, Los Angeles; Eddie Gean Rothrock, Whittier, both of Calif.

[73] Assignees: Delco Electronics Corp., Kokomo, Ind.; Hughes Electronics, Los Angeles, Calif.; Bell Sports, Inc., Scottsdale, Ariz.

[21] Appl. No.: 594,159

[22] Filed: Jan. 31, 1996

[51] Int. Cl.$^6$ ........................................................ A42B 3/00
[52] U.S. Cl. .................................................. 345/8; 345/115
[58] Field of Search ................................. 345/8; 348/115; 359/630, 631

[56] References Cited

U.S. PATENT DOCUMENTS

| | | | |
|---|---|---|---|
| Re. 28,847 | 6/1976 | Vizenor | 350/302 |
| 3,059,519 | 10/1962 | Stanton | 88/1 |
| 3,170,979 | 2/1965 | Baldwin et al. | 88/1 |
| 3,205,303 | 9/1965 | Bradley | 178/6.8 |
| 3,608,935 | 9/1971 | Hodapp, Jr. | 287/23 |
| 3,666,887 | 5/1972 | Freeman | 178/7.85 |
| 3,712,714 | 1/1973 | Uyeda et al. | 350/301 |
| 3,833,300 | 9/1974 | Rymes | 356/13 |
| 3,870,405 | 3/1975 | Hedges | 350/294 |
| 3,923,370 | 12/1975 | Mostrom | 350/55 |
| 4,026,641 | 5/1977 | Bosserman et al. | 350/298 |
| 4,153,913 | 5/1979 | Swift | 358/93 |
| 4,156,292 | 5/1979 | Helm et al. | 2/6 |
| 4,181,405 | 1/1980 | Cohen | 350/331 |
| 4,220,400 | 9/1980 | Vizenor | 350/174 |
| 4,231,117 | 11/1980 | Aileo | 2/6 |
| 4,361,384 | 11/1982 | Bosserman | 350/174 |
| 4,439,157 | 3/1984 | Breglia et al. | 434/40 |
| 4,465,347 | 8/1984 | Task et al. | 350/538 |
| 4,719,462 | 1/1988 | Hawkins | 342/20 |
| 4,722,601 | 2/1988 | McFarlane | 356/152 |
| 4,751,691 | 6/1988 | Perera | 368/10 |
| 4,753,514 | 6/1988 | Kubik | 350/174 |
| 4,757,714 | 7/1988 | Purdy et al. | 73/597 |
| 4,761,056 | 8/1988 | Evans et al. | 350/174 |
| 4,806,011 | 2/1989 | Bettinger | 351/158 |
| 4,869,575 | 9/1989 | Kubik | 350/174 |
| 4,977,401 | 12/1990 | Sjöberg | 340/975 |
| 5,162,828 | 11/1992 | Furness et al. | 353/122 |
| 5,189,512 | 2/1993 | Cameron et al. | 358/93 |
| 5,321,416 | 6/1994 | Bassett et al. | 345/8 |
| 5,581,271 | 12/1996 | Kraemer | 345/8 |
| 5,585,813 | 12/1996 | Howard | 345/8 |

FOREIGN PATENT DOCUMENTS

2238627-B   11/1990   United Kingdom .

*Primary Examiner*—Kee M. Tung
*Assistant Examiner*—Vincent E. Kovalick
*Attorney, Agent, or Firm*—Jimmy L. Funke

[57] ABSTRACT

A visual display and helmet assembly is configured to function in the presence of a harsh environment, e.g., high wind, vibration and shock and strong ambient light. The visual display preferably includes a transmissive liquid-crystal display to reduce the display's size and to enhance the intensity of a virtual image. In addition, the display is preferably reconfigurable so that different display indicia can be programmed as desired. To reduce probability of injury to a user, the visual display is carried on the exterior of the helmet with its center of mass positioned substantially on the midsagittal plane of the user. In addition, a mount permits the visual display to detach from the helmet when it is subjected to forces above a predetermined threshold. The mount is also permits yielding movement between the visual display and the helmet to enhance viewing of the image.

29 Claims, 6 Drawing Sheets

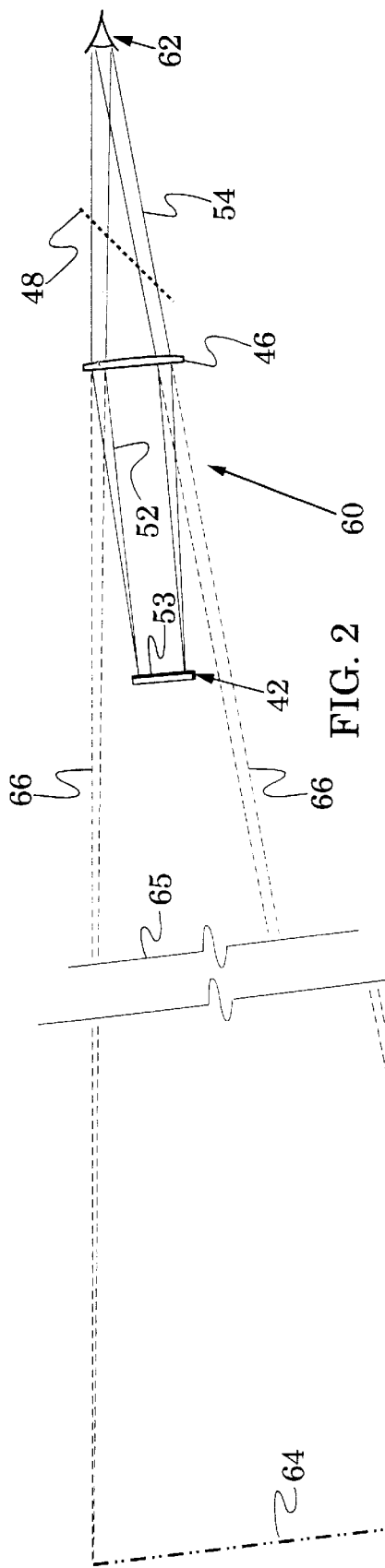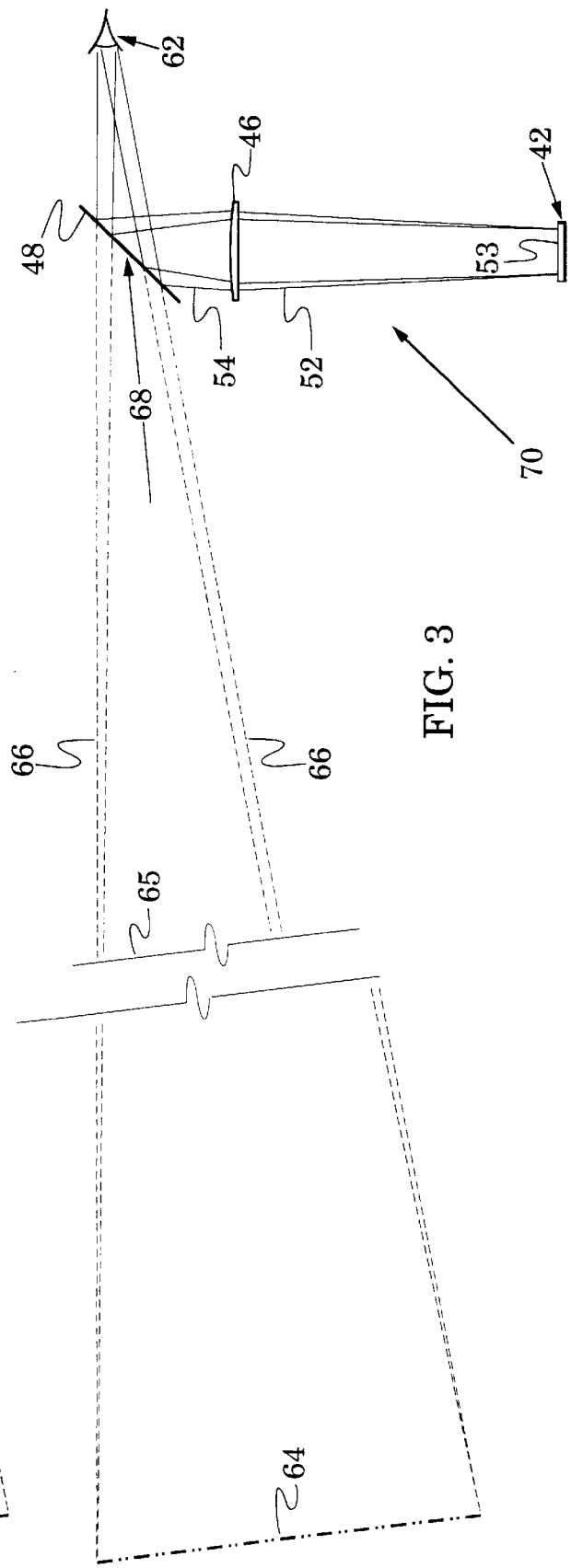

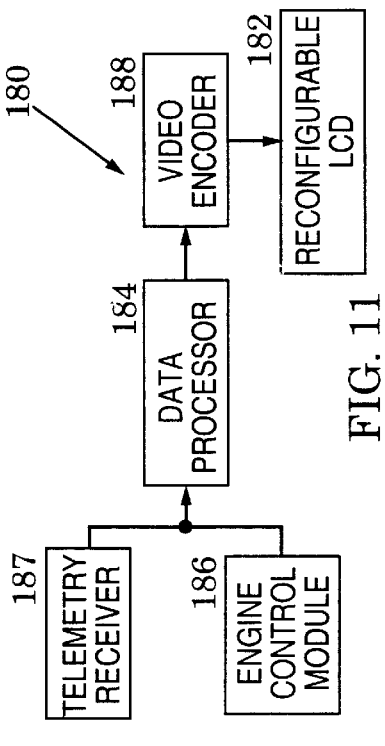
FIG. 11
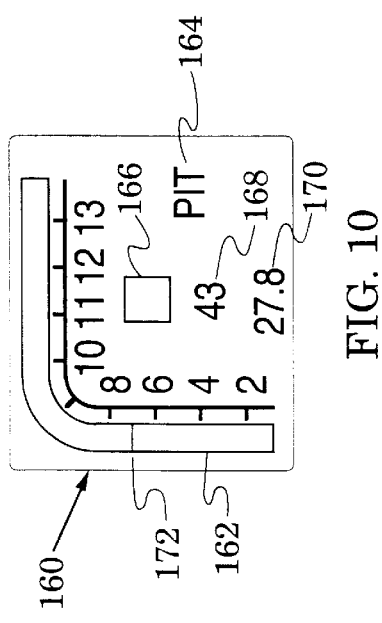
FIG. 10
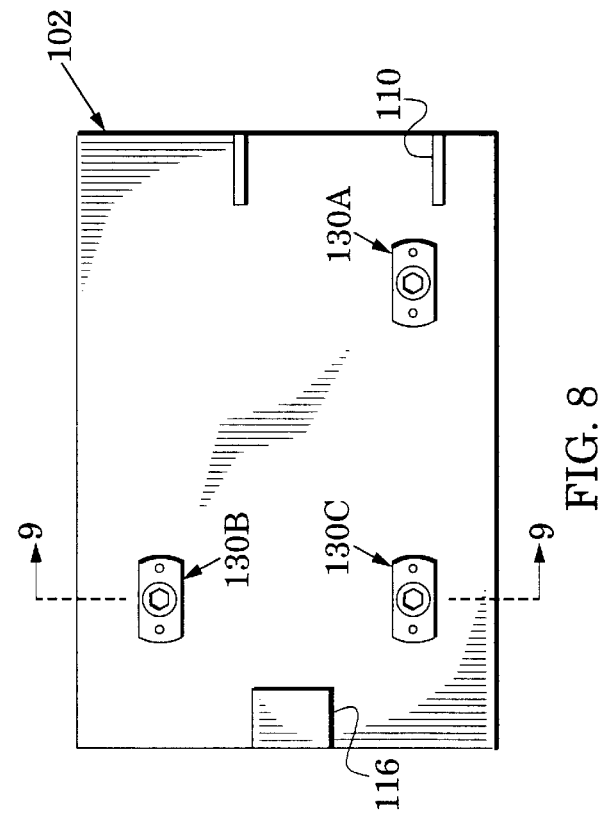
FIG. 8
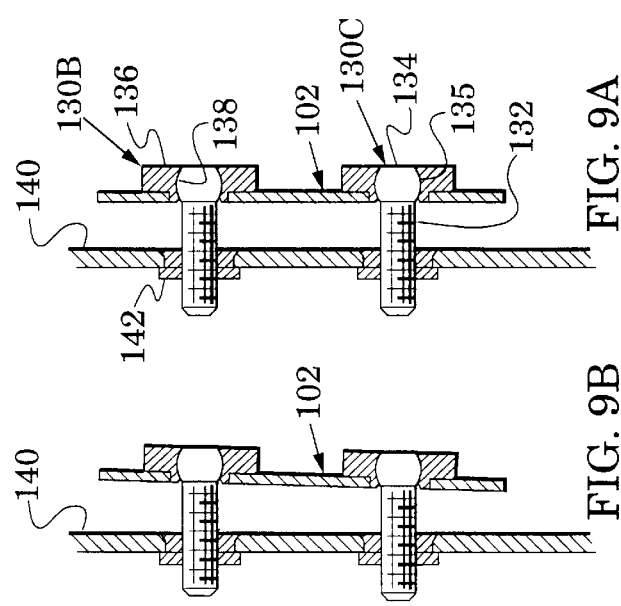
FIG. 9A
FIG. 9B

VISUAL DISPLAY AND HELMET ASSEMBLY

BACKGROUND OF THE INVENTION

1. Field of the Invention

The present invention relates generally to visual displays and more particularly to headgear-mounted displays.

2. Description of the Related Art

A variety of visual-display systems have been proposed for presenting an information display to a system user while that user is concentrating on a visual scene which is critical to the user's immediate task, e.g., driving a high-speed motor vehicle, piloting an aircraft or operating a mobile, motion-picture camera. These systems are generally positioned on the user's head and are often integrated into a headgear which is associated with the user's task, e.g., eyeglasses or a helmet. The systems are typically referred to as head-up displays (HUD) because they facilitate concentration on a visual scene that is generally in front of the user.

Visual-display systems have included a variety of image generators. For example. U.S. Pat. No. 3,833,300 combines an image generator in the form of a cathode-ray tube with a helmet visor which is configured in the shape of a parabola. An optical fiber conducts the image of the cathode-ray tube to the focal point of the parabola. From the focal point, the image is directed at the visor. The visor preferably carries a reflective coating to enhance a reflection of the image to the wearer of the helmet.

A parabolically-shaped, helmet visor is also described in U.S. Pat. No. Re. 28,847. An image generator is positioned at the focal point of the parabola and directed at the visor surface. A coating is applied to the visor surface to cause it to be a combining surface, i.e., it is partially reflective and partially transparent. In another embodiment, the visor is altered to place the parabolic focal point within the forehead of the wearer of the helmet and a mirror is added to reflect the image from the image generator to the visor. The mirror is positioned so that a virtual image appears to be located at the focal point.

Another exemplary use of a cathode-ray tube as an image generator is found in U.S. Pat. No. 4,761,056. From a cathode-ray tube, an image is reflected from a first parabolic mirror and then directed along an optical path which is defined by a pair of fold mirrors. The optical path intersects a second parabolic mirror which is in the field of view of the system's user. In one embodiment the first and second parabolic mirrors are segments of a helmet visor. The parabolic mirrors are preferably formed by partially reflective coatings on the visor.

U.S. Pat. No. 5,189,512 describes yet another exemplary display system in which a cathode-ray tube functions as an image generator. An image, which is formed by the cathode-ray tube, is directed along an optical path with a pair of fully-silvered mirrors. Positioned between the mirrors is a double convex lens. The second mirror is placed in front of one eye (the "display eye") of a user of the system. The spacing between the lens and the cathode-ray tube is adjusted to position a virtual image at a distance, e.g., 3 meters, sufficient to avoid the need for extensive refocusing when attention is diverted away from the user's immediate task. Preferably, an occlusion device in the form of an opaque element is positioned in front of the user's other eye (the "non-display eye"). This element is arranged in a shape which approximates the shape of the perceived image in the display eye. The occlusion device is intended to prevent "binocular rivalry" in which the brain's perception areas become confused by conflicting visual information.

Other visual-display systems have employed liquid-crystal displays as a display generator. In U.S. Pat. No. 4,181,405, each visual element, e.g., an alpha-numeric symbol, of an information display is generated by a reflective liquid-crystal display. A helmet visor is configured with a plurality of convex lenses and each liquid-crystal display is separated from a different lens by a space that is generally equal to or less than the focal length of the respective lens.

Another exemplary system is described in U.S. Pat. No. 4,869,575, which positions a reflective liquid-crystal display in association with a body of optically-clear material. The body has a prism portion and a collimating lens portion. In one embodiment, the prism portion forms a planar surface and a pair of reflecting surfaces and the lens portion forms a spherical convex lens. The liquid-crystal display is positioned against the planar surface and the body is mounted to the frame of a pair of eyeglasses with the lens positioned proximate to one glass of the eyeglasses. In operation, the lens receives the image from the reflecting surfaces and forms a virtual image at optical infinity. To view the virtual image, a user looks slightly above the normal sight line through the eyeglasses.

In still another exemplary system, U.S. Pat. No. 5,162,828 mounts a transmissive liquid-crystal display in various headgears, e.g., ski goggles, scuba dive masks and sunglasses. The liquid-crystal display is illuminated by ambient light that reaches the display through a diffusing filter. Alternatively, the ambient light is replaced by light from an incandescent source which is reflected from a parabolic mirror. In one embodiment, a partially-reflective mirror is positioned above or to the side of the user. A lens is placed between the liquid-crystal display and the mirror to provide an apparent optical distance which is selected to correspond to the visual distance that is associated with the immediate task of the wearer.

Although these exemplary display systems may adequately present an information display to a system user when the user's immediate task is performed in a benign environment (e.g., a motion-picture studio), they generally are not suitable for tasks (e.g., operating a racing vehicle) that are performed in the presence of harsh conditions (e.g., high wind, vibration and shock and strong ambient light). Under these conditions, a display system attached to an eyeglass frame (see U.S. Pat. No. 5,162,828) would not survive. A display system arranged within a helmet (see U.S. Pat. No. Re. 28,847) can become a lethal object to the system user and one whose center of mass is located at one side of a user's head (see U.S. Pat. No. 4,761,056) can induce dangerous twisting forces on the head. Such harsh conditions demand a system which can present an image that is visible in the presence of strong ambient light and which is configured to protect a user of the system from injury.

SUMMARY OF THE INVENTION

The present invention is directed to an assembly of a helmet and a visual-display system which is suitable for a user whose immediate task is performed in the presence of harsh conditions, e.g., high wind, vibration and shock and strong ambient light.

This goal is accomplished with the recognition that a visual-display system for such an assembly should not only be compact and lightweight, but to reduce the risk of injury to the user, it should be positioned on the exterior of a protective helmet, its center of mass should be positioned substantially on the user's midsagittal plane and it should be detachable in response to forces which exceed a predetermined threshold. To reduce confusion in the brain perception areas of the user, a virtual image produced by the display system should have an image distance of at least 3.5 meters and should be positioned to present a monocular image, i.e., the image should be visible to only one eye of the user. To facilitate viewing of the virtual image, the mount should permit yielding movement between the display system and the helmet in response to vibration and shock.

Realization of such an assembly is facilitated with a visual-display system that includes a transmissive image generator, an image illumination system, a convergent lens and a combiner. The illuminator is positioned to direct incident light upon a first face of the image generator, which transmits light from a second face. The convergent lens is positioned to process at least a portion of the transmitted light; the combiner is partially reflective and partially transmissive and is positioned to receive light transmitted from the lens. To enhance the brightness of the image, the incident light is generated by a radiant element with a spatial form that substantially conforms with the spatial form of the image generator's first face. Preferably, the image generator is reconfigurable to permit the programming of different display indicia as desired.

The display system is mounted with its center of mass positioned substantially on the user's midsagittal plane, with its mount configured to facilitate the forcible detachment of the visual display from the helmet. Preferably, the mount includes resilient members arranged to obtain a yielding movement between the display system and the helmet and an energy-absorbing device to dampen this movement.

The image generator may be a transmissive liquid-crystal display. It can be mounted to the helmet with a number of arcuately-shaped members and mating sockets which are carried by the helmet and the mount. This arrangement facilitates both the positioning of the combiner and the forcible removal of the visual display from the helmet. The mount includes resilient members which are positioned to yieldingly permit movement between the visual display and the helmet, and an energy-absorbing device positioned to dampen this movement.

The novel features of the invention are set forth with particularity in the appended claims. The invention will be best understood from the following description when read in conjunction with the accompanying drawings.

BRIEF DESCRIPTION OF THE DRAWINGS

FIG. 2 is a schematic of a preliminary optical path which is associated with the visual-display system of FIG. 1;

FIG. 3 is a schematic of the optical path of FIG. 2 after its modification with a combiner;

FIG. 8 is a front elevation view of an adjustable carrier in the mount of FIGS. 7A–7C;

FIG. 9A is an enlarged, schematized view along the plane 9—9 of FIG. 8 with the carrier in a first position;

FIG. 9B is a view similar to FIG. 9A with the carrier in a second position;

FIG. 10 is an exemplary virtual image that is displayed by the visual-display system of FIG. 1; and FIG. 11 is a block diagram of an image generator control system which can be used when an image generator in the assembly of FIG. 1 is realized as a reconfigurable generator.

DESCRIPTION OF THE PREFERRED EMBODIMENTS

Figure 1:
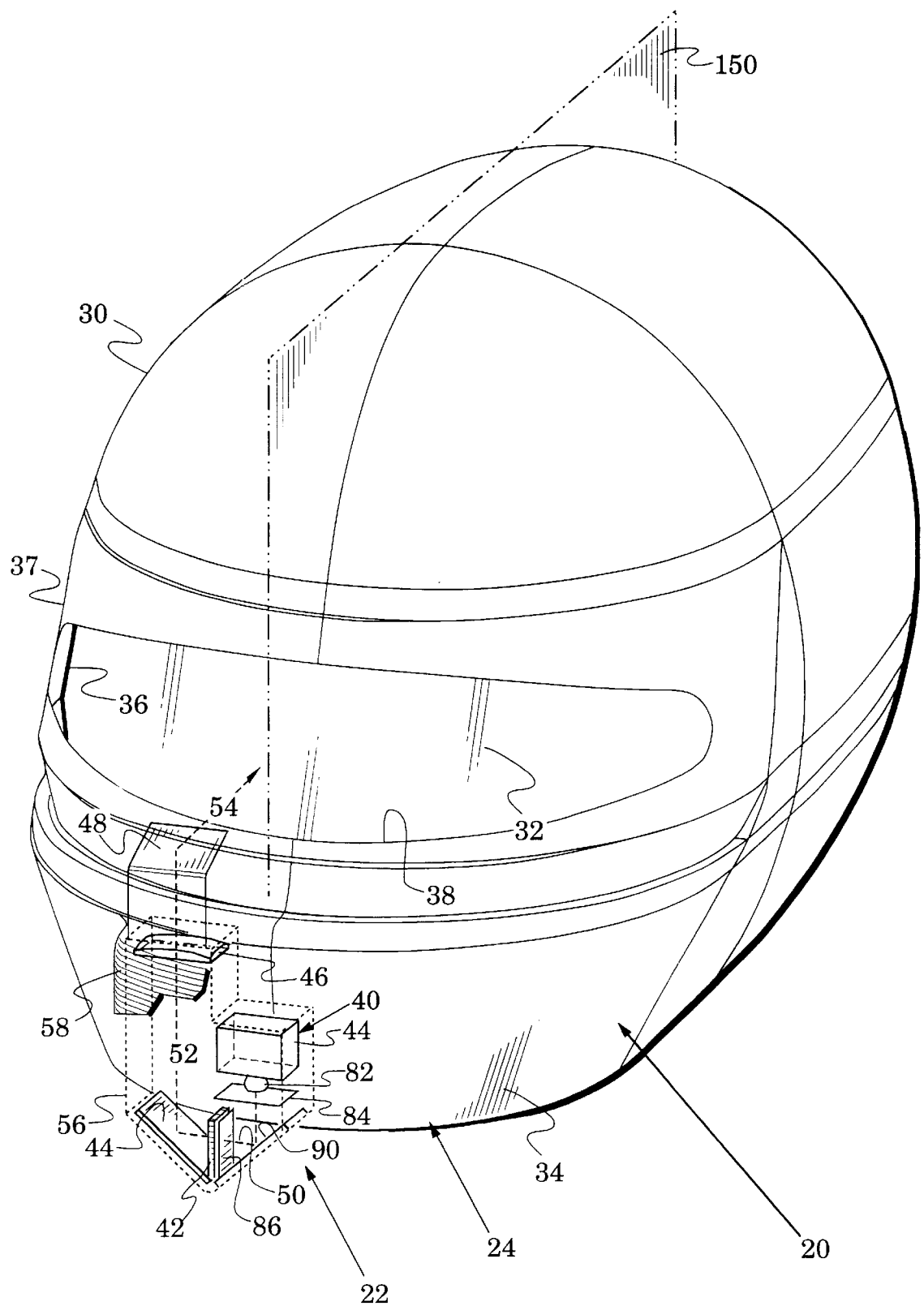
FIG. 1 is a perspective view of an assembly, in accordance with the present invention, of a visual-display system and a protective helmet.
Figure 6:
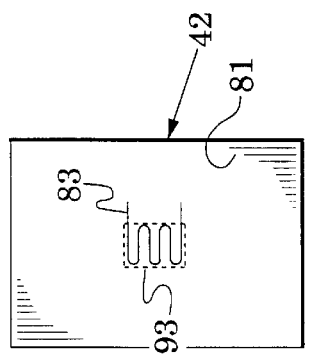
FIG. 6 is an enlarged view of a radiant element and an image generator face in the optical path of FIG. 5.
Figure 7A:
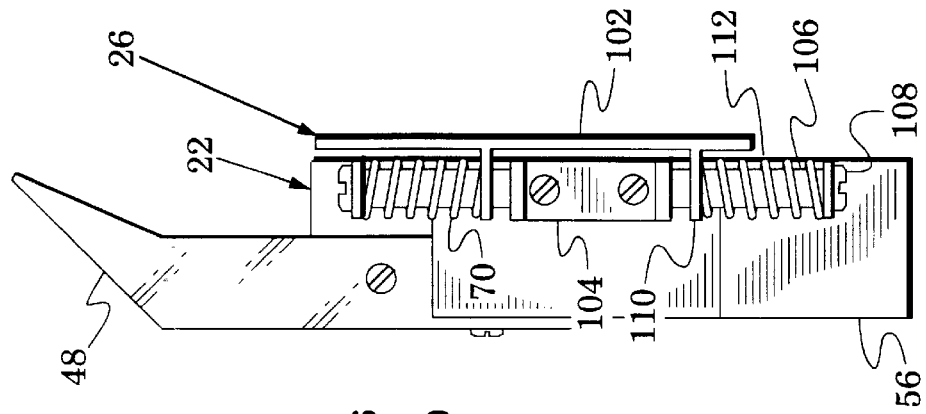
FIG. 7A is a side elevation view of the visual-display system of FIG. 1 with a mount which connects it to the helmet of FIG. 1; for clarity of illustration, the mount is not shown in FIG. 1 and an aerodynamic shroud of FIG. 1 is not shown in FIG. 7A.
Figure 7B:
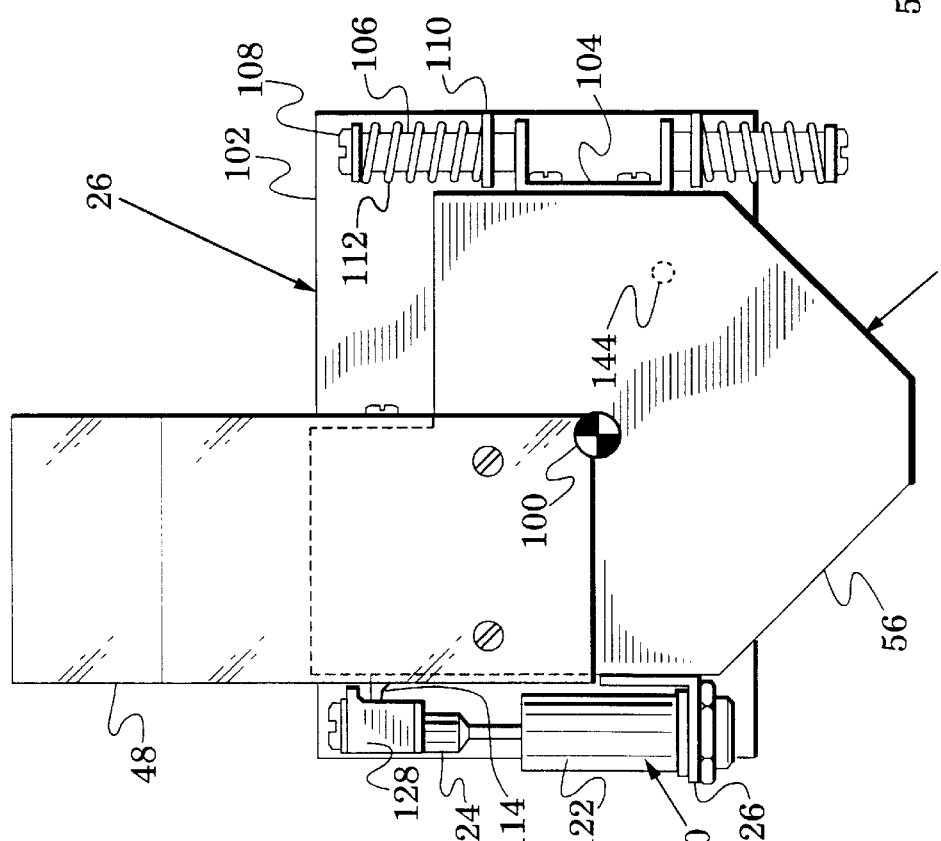
FIG. 7B is a front elevation view of the visual-display system and mount of FIG. 7A.
Figure 7C:
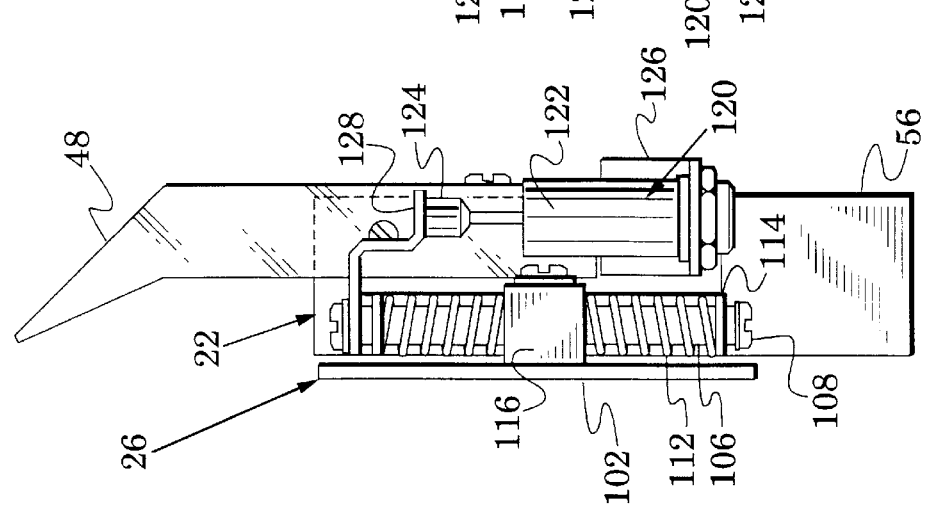
FIG. 7C is an opposite side elevation view of the visual-display system and mount of FIG. 7A.

An assembly 20 of a visual-display system 22 and a helmet 24 is shown in FIG. 1. In particular, FIG. 1 illustrates the optical arrangement of the visual-display system 22 and the positioning of the visual-display system relative to the helmet 24. FIGS. 2–6 illustrate details of an optical path of the visual-display system 22. FIGS. 7A, 7B and 7C illustrate mechanical details of the visual-display system 22 and of a mount 26 which connects it with the helmet 24. Finally, FIGS. 8, 9A and 9B illustrate further details of the mount.

The helmet 24 of FIG. 1 has a shell 30 and a visor 32 which can rotate on the shell 30 between a down position and an up position. The visor 32 is shown in its down position in FIG. 1. The shell 30 includes a chin portion 34 which is fixed to the other portions of the shell. The helmet 24 is configured with an interior 36 for reception of the head of a user of the visual-display system 20 and an exterior 37 which provides protection for the user's head. An aperture 38 is formed in the visor 32 to facilitate the view of the user through the helmet 24.

The visual-display system 22 of FIG. 1 includes an image illuminator 40, an image generator 42, a reflective mirror 44, a convergent lens 46 and a combiner 48. The image illuminator 40 is arranged to direct incident light (indicated by a broken line 50) upon a first face of the image generator 42 which produces transmitted light (indicated by a broken line 52) that radiates from a second face of the image generator 42. The transmitted light 52 is reflected from the mirror 44 and directed to the lens 46. After processing by the lens 46, at least a portion (indicated by a broken line 54) of the transmitted light 52 is reflected from the combiner 48 and directed through the visor 32 to one eye of the user of the visual-display system 22 (in the embodiment of FIG. 1, the combiner is positioned to present a virtual image to the right eye).

FIG. 1 shows that, except for the combiner 48, the elements of the visual-display system 22 are positioned within a housing 56 (indicated in broken lines) and are protected by an aerodynamic shroud 58 (partially indicated at the left side of the system 22). Only the combiner 48 extends above the housing 56 to be visible to the user.

A more detailed description of the assembly 20 will be facilitated by preceding it with a description of the optical path of the visual-display system 22 and a description of a mount which connects the system 22 with the helmet 24 (for clarity of illustration, the mount is not shown in FIG. 1).

Accordingly, attention is now directed to a preliminary optical path 60 in FIG. 2 in which the lens 46 is positioned between the image generator 42 and the eye 62 of the user of the visual-display system (22 in FIG. 1). The lens 46 is a convergent lens, e.g., a convex lens or a plano-convex lens, with a focal length. The image generator 42 is preferably positioned at a distance from the lens 46 that is equal to or less than the focal length. In operation, transmitted light 52 from a face 53 of the image generator 42 is directed at the lens 46 and at least a portion 54 of this light is brought to a focus on the retina of the eye 62 by action of the lens 46 and the lens of the eye 62.

However, the eye 62 appears to see a virtual image 64 which is at the end of extensions 66 of rays of the transmitted light portions 54. If the image generator 42 and the lens 46 are separated by the focal length of the lens 46, the extension rays 66 will be collimated, i.e., parallel, and the perception areas in the brain of the user will perceive the virtual image 64 to be at infinity. If the image generator 42 and the lens 46 are separated by less than the focal length of the lens 46, the virtual image 64 will be perceived to be at a distance less than infinity.

The simple optical path arrangement 60 is generally known as a magnifier because the virtual image 64 is not only perceived to be at a distance greater than the distance to the lens 46 but it is magnified relative to the size of the image generator 42 (the virtual image 64 is aptly named because a screen placed at that location will not display an image). Typically, the distance to the virtual image 64 far exceeds the focal length of the lens 46. This spatial relationship is indicated in FIG. 2 by the introduction of a break 65 in the extension rays 66.

Although the magnifier arrangement of FIG. 2 produces a magnified virtual image 64, it also obscures the view of the eye 62 because of the position of the lens 46 and the image generator 42. Accordingly, a combiner 48 is positioned as shown in FIG. 2 to obtain the optical path 70 of FIG. 3 in which the lens 46 and image generator 42 are swung downwards away from the field of view of the eye 62.

The combiner 48 is a partially reflective and partially transmissive mirror. Such mirrors are often referred to as beamsplitters. An exemplary beamsplitter consists of a plate of optical glass having a deposited dielectric film on a first surface which produces partial reflection and an antireflection film deposited on a second surface. Beamsplitters are fabricated with various reflection/transmittance ratios, e.g., 30/70 and 50/50. Because of its ability to reflect and transmit, the combiner 48 "combines" the transmitted light portion 54 with light 68 from a distant visual scene (which is associated with the user's immediate task) and directs them to the eye 62. In practice, the reflection/transmittance ratio of the combiner 48 is selected to obtain a desired balance of the intensities of the light portion 54 and the scene light 68 for the eye 62.

Figure 4:
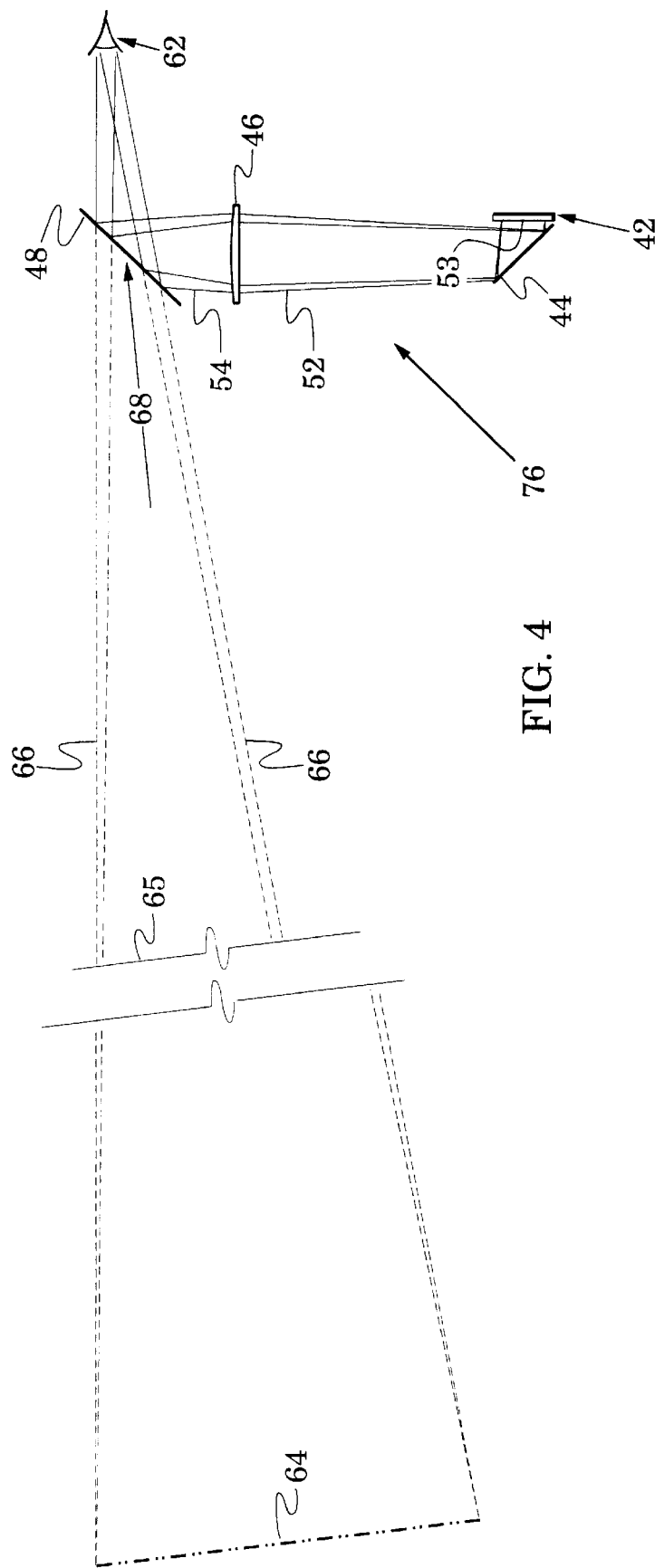
FIG. 4 is a schematic of the optical path of FIG. 3 after its modification with a reflective mirror.

In order to reduce the combined size of the optical components, a reflective mirror 44 is introduced into the optical path 70 to convert it to the optical path 76 of FIG. 4. In this embodiment the mirror 44 is oriented at an angle which places the image generator 42 in an orthogonal relationship with its position in the optical path 70 of FIG. 3.

Figure 5:
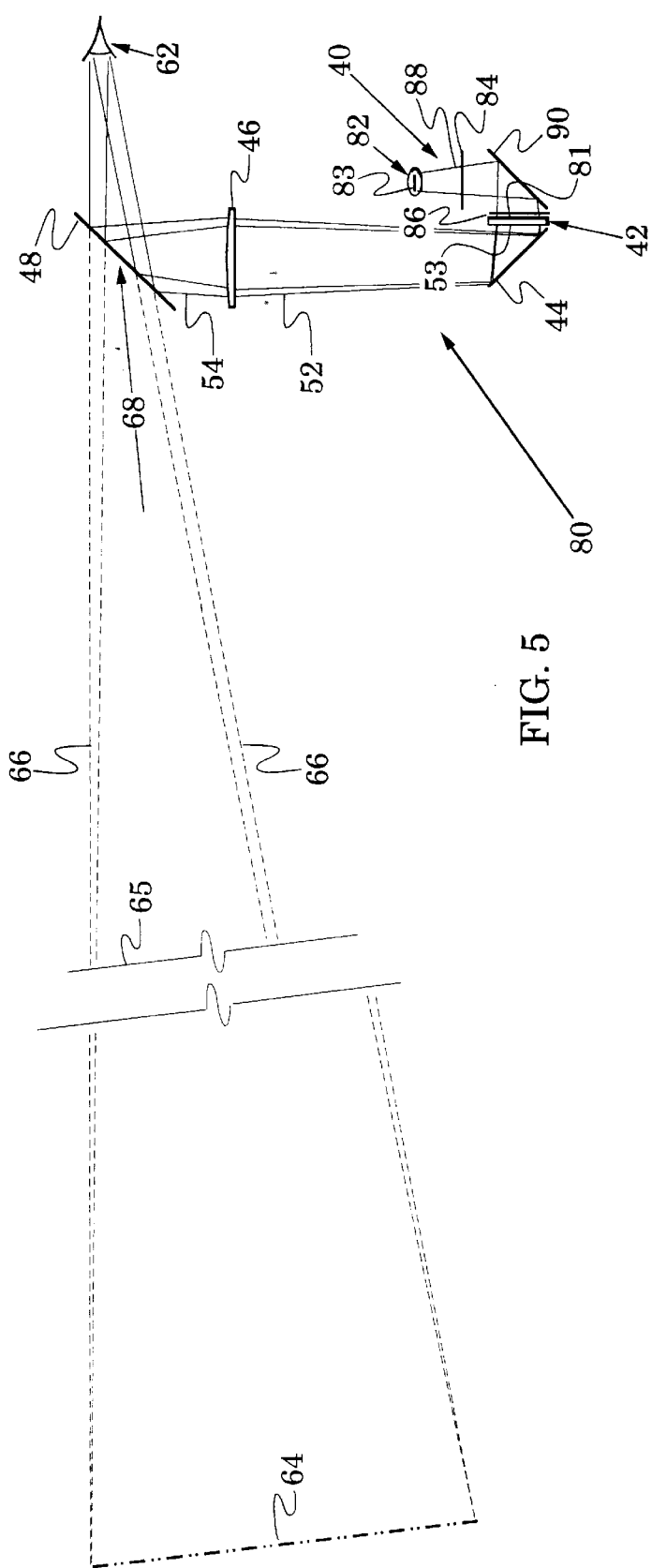
FIG. 5 is a schematic of the optical path of the visual-display system of FIG. 1, the schematic being a modification of the schematic of FIG. 4 with an image illuminator.

To illuminate the transmissive image generator 42, an image illuminator 40 is introduced in the optical path 80 of FIG. 5. The image illuminator is directed at a face 81 of the image generator 42 which is opposite the face 53. The image illuminator 40 includes a lamp 82 which has a radiant element 83. It also includes a heat shield 84, and a diffuser 86. In operation, the radiant element 83 radiates illumination light 88 of which a portion is heat in the form of infrared light. The heat shield 84 is preferably configured to reflect at least a portion of the infrared light from the optical path so that it does not overly heat the image generator 42. Although absorptive heat shields can also be used in embodiments of the invention, a reflective heat shield removes the thermal energy from the visual-image system (20 in FIG. 1) which simplifies the thermal design of the system. The diffuser 86 diffuses the illumination light 88 to enhance the uniformity of the illumination of the face 81.

In order to further reduce the combined size of the optical components, a second reflective mirror 90 is introduced between the lamp 82 and the image generator 42. The illumination light 88 is directed by the mirror 90 to be incident upon the image generator face 81. If the illumination light 88 and the transmitted light 52 are considered to be first and second portions of the optical path 80, FIG. 5 illustrates that the compactness of the visual-display system 20 is enhanced by arranging the second mirror 90 so that the optical path portions 88 and 52 are substantially parallel.

Although different embodiments of the visual-display system 20 can be formed with various reflective and radiant image generators 42 (e.g., reflective liquid-crystal displays and cathode-ray tubes) which remove the need for the image illumination system 40, a transmissive liquid-crystal display is especially suitable for use when the system 22 is in the presence of strong ambient light. With such a display, the intensity of the illumination system 40 can be increased as required to obtain a desired balance of the transmitted light portion 54 and the scene light 68 at the eye 62.

To further enhance the intensity and uniformity of the transmitted light portion 54, the spatial shape of the radiant element 83 is preferably configured to conform with the spatial shape of the image generator. For example, FIG. 6 illustrates a radiant element 83 in the form of a lamp filament. The radiant element 83 is configured to substantially fill a rectangle 93 which is a reduced version of the shape of the face 81 of the image generator 42. The intensity and uniformity of the transmitted light portion 54 can be further enhanced by including a lens in the lamp 82 which focuses the radiation of the radiant element 83 upon the face 81.

Attention is now directed to FIGS. 7A–7C which illustrate a mount 26 that connects the visual-display system 22 and helmet 24 of FIG. 1. These figures indicate the center of mass 100 of the visual-display system 22 and show the housing 56 which encloses the optical elements of the visual-display system except for the combiner 48. As shown in FIG. 1, the combiner 48 extends upward from the housing 56 so as to place it in a selected portion of the field of view of one eye of a user of the system (the housing is configured to provide an optical path between the lens 46 and the combiner 48).

The mount 26 includes a carrier 102 and a bracket 104 which is attached to one side of the housing 56. The carrier 102 also includes a pair of hollow pins 106 that are fixed to the bracket 104 with screws 108. The carrier 102 is formed to define a pair of lugs 110 which each have a slip-fit hole that slidingly receives a different one of the pins 106. Resilient members in the form of a pair of helical springs 112 are captured between the screws 108 and the lugs 110.

The mount 26 further includes a bracket 114 which is attached to an opposite side of the housing 56 and the mount 102 carries a block 116. Another pair of guide pins 106 are attached to the block 116 with screws 108. The bracket 114 has slip-fit holes which each slidingly receive a different one of the pins 106. Another pair of springs 112 are captured between the screws 108 and the block 116.

Preferably, the mount 26 also includes an energy-absorbing device in the form of a dashpot 120. The dashpot 120 has a cylinder 122 which slidingly receives a piston 124. The cylinder 122 is fixed to the housing 56 with a bracket 126 and the piston 124 is fixed to one of the guide pins 106 with another bracket 128.

When the optical display and helmet assembly 20 of FIG. 1 is used in an environment of strong shock and vibration forces, e.g., that of a racing vehicle, various frequencies of these forces are applied to the visual-display system 22 via the helmet 24. Because of the structure of the mount 26 in FIGS. 7A–7C, the visual-display system 22 can move vertically against the yielding compression of the springs 112 and the restoring force of the compressed springs 112 returns the system 22 back to an equilibrium position. The yielding suspension absorbs energy and reduces the movement frequency of the visual-display system 22 which enhances the quality of the virtual image as seen by the system user. This image view is further enhanced by the energy-absorbing device 120 which acts to dampen the vibration and shock frequencies.

FIGS. 8, 9A and 9B illustrate that the mount 26 is secured to the helmet (24 in FIG. 1) by N attachment devices 130 (in order to illustrate the operation of the attachment devices 130, they are illustrated in enlarged, schematized views in FIGS. 9A and 9B). Preferably, N=3 which facilitates positioning the combiner (48 in FIGS. 7A–7C) by adjustment of attachment devices 130A, 130B and 130C. The mount 26 includes screws 132 which have heads 134 with a arcuately-shaped portion 135. The carrier 102 includes blocks 136 which have sockets 138. The blocks 136 are preferably of a resilient material, e.g., nylon. A frontal portion 140 of the helmet shell's chin portion (34 in FIG. 1) is fitted with threaded nuts 142. The heads 134 are rotatably received in the sockets 138 and the screws 132 threadably received in the nuts 142.

In operation, rotating the screw of device 130B changes the vertical inclination of the carrier 102 as illustrated in FIG. 9B, and rotating the screws of the device 130A changes the transverse inclination of the carrier 102. Rotating the screw of the device 130C changes both inclinations and rotating all three screws together changes the spacing between the carrier 102 and the frontal portion 140. This attachment system facilitates adjustment of the position of the combiner (48 in FIG. 1) to accommodate each user of the visual display and helmet assembly (20 in FIG. 1). Access to the devices 130A–130C is provided by through holes in the housing 56 such as the hole 144 indicated in FIG. 7B in broken lines. The through holes are positioned to avoid optical elements of the visual-display system 22.

In addition, application of forces above a predetermined threshold on the visual-display system 22 will separate it from the helmet 24 as the heads 134 are pulled out of their respective sockets 138. Selection of appropriate mechanical parameters (e.g., radius dimensions of the heads 134 and sockets 138, thickness of the blocks 136, material of the resilient blocks 136 and so on) can be varied to set a desired force threshold. Without this feature of the invention, forces applied against the visual-display system 22 in an accident would induce severe twisting forces on the helmet 24 and these twisting forces would greatly increase the probability of injury to the user of the assembly.

Having described the mount 26 of FIGS. 7A–7C, 8, 9A and 9B, attention is returned to the assembly 20 of FIG. 1.

The helmet 24 and its exterior 37 are configured to provide protection for the head of a user of the assembly 20. This protection is lessened if foreign objects are placed within the helmet's interior 36. Accordingly, the visual-display system 22 is positioned adjacent the helmet's exterior 37. To reduce the probability of injury, it is also important that the assembly 20 not induce twisting forces upon the user's head. For this reason, the protective helmet 24 and the shroud 58 (which surrounds the visual-display system 22) are symmetrically and aerodynamically configured about a vertical, fore-and-aft plane 150 which is substantially coplanar with the midsagittal plane (the vertical, fore-and-aft plane of the human body) of the user's head. In addition, the mount (26 in FIGS. 7A–7C) is arranged to place the center of mass (100 in FIGS. 7A–7C) of the visual-display system 22 substantially on the fore-and-aft plane 150. These structures and relationships insure that transverse forces on the user's head are substantially balanced under conditions of high wind, vibration and shock.

To further reduce twisting forces on the user's head in event of an accident, the mount (26 in FIGS. 7A–7C) is also configured to permit the visual-display system 22 to separate from the helmet 24 when the system 22 is subjected to forces over a predetermined threshold.

Because the human eye has a pupil diameter of ~3 millimeters (in bright sunlight), it does not have to accommodate (tense or relax) to keep images focused on the retina if those images are all distant by greater than ~3.7 meters. In addition, at a distance of ~4 meters, the light rays of a monocular virtual image are substantially parallel with those of a distant scene and the perception of double images is avoided. Laboratory studies indicate that size and distance estimation of objects are affected by the convergence-controlling muscles of the eye. The near point (closest point of accommodation) of the human eye is in the range of 100–200 millimeters. The eye will be attracted to objects which are beyond the near point and will try to focus on them.

Because of the foregoing optical considerations, the path spacing between the image generator 42 and the lens 46 is arranged so that the virtual image 64 is greater than ~4 meters from the user's eye 62 (see FIG. 5). The combiner 48 is typically enclosed in a thin frame and, accordingly, the combiner 48 is spaced less than ~88 millimeters from the user's eye to reduce its attraction to the eye. The combiner 48 is selected with a transparency which is sufficient to reduce binocular rivalry, i.e., the lighting of the distant scene is sufficiently balanced. Confusion in the perception areas of the brain are preferably reduced by positioning the combiner 42 so that the virtual image 64 is visible to only one eye (e.g., positioned downward and to one side of the fore-and-aft plane 100).

The field of view of the virtual image 64 in FIG. 5 is selected to minimize its effect upon the distant scene while still permitting the display of the desired information, e.g., the information of the image 160 in FIG. 10. An exemplary field of view is 5° vertically and 10° horizontally and an exemplary combiner size is 6.2×12.7 millimeters. With this field of view and a large pixel count in the image generator, e.g., 640×260, a high degree of angular resolution, e.g., ~3 pixels/milli-radian, is obtained in the virtual image. By positioning the combiner 48 below a horizontal plane, e.g., by ~13.5°, most details of the distant scene are unobscured by the virtual image.

Because transmissive liquid-crystal displays are smaller than conventional displays, e.g., cathode-ray tubes, the focal length of the lens 46 can be reduced and the spacing between the illumination system 40 and the image generator 42 can also be reduced. When these advantages are combined with a folded optical path (obtained with the mirrors 44 and 90), a compact, light weight visual-display system 22 is obtained as is illustrated by the following description of a prototype of the invention.

A working prototype of the assembly 20 of FIG. 1 was fabricated and tested. The prototype helmet 24 was part number Feuling SS by Bell Sports of Rantoul, Ill. In the visual-display system 22 of the prototype, the image generator 42 was a F07KM200 transmissive liquid-crystal display from Epson America, Inc. of Torrance, Calif., the convergent lens 46 had a focal length of 75 millimeters, the combiner 48 was a plate beamsplitter part number 03BTF007 (of polycarbonate resin with a reflection/transmittance ratio of 50/50) from Helles Griot of Irvine, Calif., the lamp 82 was a lens-end, halogen lamp, part number L8017 from Gilway Technical Lamp of Woburn, Mass., and the heat shield 84 was a wide band hot mirror from OCLI of Santa Rosa, Calif. For expediency, transluscent tape was used for the diffuser 86 but an exemplary glass diffuser would be part number M43,724 from Edmund Scientific of Barrington, N.J.

The spacing between the lens 46 and the image generator 42 was set somewhat less than the focal length of the lens 46 to place the virtual image (64 in FIG. 5) ~3.5 meters from the user's eye (62 in FIG. 5). The lens 46 was spaced ~45 millimeters from the combiner 48 to position the lens 46 and other system elements out of the field of view of the system user. The lamp 82 had an optical path spacing of ~30 millimeters from the image generator 42. The selected liquid-crystal display 42 can display 256 colors, it has screen dimensions of ~14 millimeters×~10 millimeters and a pixel count of 640×260.

Electronic data, lamp power and other signal and voltage forms were provided to the visual-display system 22 through an umbilical cord which was connected through a quick-release connector. Because the prototype was especially configured for use in a high-speed, racing vehicle, it was programmed to display the information indicia in the virtual image 160 shown in FIG. 10. The image included a moving color bar 162 which indicated the engine revolutions per minute, an indicator 164 of "PIT" which would be displayed in color when a pit stop was desired, an indicator 166 whose color corresponded with selected track and vehicle conditions (e.g., green=clear track condition, yellow=caution track condition and red=low tire pressure), an indicator 168 of engine boost pressure and an indicator 170 of fuel usage. The color bar 162 was filled with a color up to the present speed, e.g., the line 172. Above a predetermined safe level, e.g., 12,000 revolutions per minute, the filled color changed to a warning color, e.g., red.

The engine status signals are received from an engine control module and the external signals, e.g., the track condition signals, are received through a telemetry system. Although the teachings of the invention can be practiced with other display generators, FIG. 10 illustrates the communication advantages that are gained when the display generator 42 is realized with a color display.

The weight of the visual-display system 22 prototype was<100 grams. It was ~20 millimeters thick with transverse measurements of ~60 millimeters×~90 millimeters. The mount 26 was configured to allow up to 2.5 millimeters of vertical movement of the visual-display system 22. The prototype of the visual-display system 22 and the helmet 24 were fitted with accelerometers and a time history was compiled under severe vibration conditions. This testing resulted in the selection of a spring constant of 8 for the springs 112 of the mount 26 (see FIGS. 7A–7C). With a pre-load compression of ~3 millimeters, each spring exerted a restoring force of ~0.45 kilograms upon the system 22.

In embodiments of the invention in which it is anticipated that the selected information indicia of FIG. 10 will not change, the image generator 42 of FIGS. 1–5 can be realized with a segmented liquid crystal display. A segmented display is one which has discrete areas dedicated for the display of predetermined indicia, e.g., message, picture or icon. This indicia can be displayed upon command but its format cannot be changed. For example, a set of several segments can be positioned such that the numbers 0, 1, 2 and so on can be displayed by segments of the set. This set cannot be changed to display a different indicia, e.g., an icon. That is, this set of icons cannot be "reconfigured".

In a reconfigurable display, each pixel of an array of pixels is independently controlled by an input signal so that the display can be commanded to show any indicia that can be formed by that array. With a reconfigurable image generator, the virtual image of 160 can be reprogrammed to change the selected information indicia. For example, during practice runs of a racing vehicle the prototype display of FIG. 10 could be programmed, i.e., reconfigured, to display additional indicia, e.g., lap speed.

Accordingly, FIG. 11 illustrates a block diagram 180 of an exemplary, image generator control system in which the image generator 42 of FIG. 1 is realized as a reconfigurable liquid-crystal display 182. The system also includes a data processor 184 which receives input signals from an engine control module 186 and a telemetry receiver 187. In response to these input signals and to a stored program, the processor 184 generates control signals in a signal format, e.g., video graphics array signals (VGA), which is structured for driving pixel arrays. These control signals are converted in a video encoder 188 to signals, e.g., National Television System Committee (NTSC) signals, which are accepted by the liquid-crystal display 182.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A helmet and visual display assembly which provides protection for a head of a wearer of said helmet and an image for viewing by said wearer, comprising:

a helmet having an interior configured to receive said head, an exterior configured to provide protection for said head and an aperture shaped and positioned to facilitate the vision of said wearer through said helmet;

a visual display having a combiner which is partially reflective and partially transmissive, said visual display configured to generate and direct said image at said combiner; and a mount connecting said visual display and said helmet, said mount including N attachment devices which connect said mount and said helmet, and a resilient member positioned to yieldingly permit movement between said visual display and said helmet;

wherein said mount is arranged to position said helmet between said visual display and said head when said head is received within said interior with said combiner positioned to be visible through said aperture to said wearer;

said helmet is arranged substantially symmetrically about a fore-and-aft helmet plane which is substantially coplanar with a midsagittal plane of said head when said head is received within said interior; and said visual display and said mount have a combined center of mass and are arranged with said center of mass positioned substantially on said fore-and-aft plane.

2. A helmet and visual display assembly which provides protection for a head of a wearer of said helmet and an image for viewing by said wearer, comprising:

a helmet having an interior configured to receive said head, an exterior configured to provide protection for said head and an aperture shaped and positioned to facilitate the vision of said wearer through said helmet;

a visual display having a combiner which is partially reflective and partially transmissive, said visual display configured to generate and direct said image at said combiner; and a mount connecting said visual display and said helmet;

N arcuately-shaped members carried by one of said helmet and said mount;

N sockets carried by the other of said helmet and said mount, each of said sockets configured to rotatably and removably receive a different one of said arcuately-shaped members;

wherein said mount is arranged to position said helmet between said visual display and said head when said head is received within said interior with said combiner positioned to be visible through said aperture to said wearer;

said helmet is arranged substantially symmetrically about a fore-and-aft helmet plane which is substantially coplanar with a midsagittal plane of said head when said head is received within said interior; and said visual display and said mount have a combined center of mass and are arranged with said center of mass positioned substantially on said fore-and-aft plane.

3. The assembly of claim 2, wherein N=3.

4. The assembly of claim 2, wherein said mount includes a resilient member positioned to yieldingly permit movement between said visual display and said helmet.

5. The assembly of claim 4, wherein said mount includes an energy-absorbing device positioned to dampen said movement between said visual display and said helmet.

6. A helmet and visual display assembly which provides protection for a head of a wearer of said helmet and an image for viewing by said wearer, comprising:

a helmet having an interior configured to receive said head, an exterior configured to provide protection for said head and an aperture shaped and positioned to facilitate the vision of said wearer through said helmet;

a visual display having a combiner which is partially reflective and partially transmissive, said visual display configured to generate and direct said image at said combiner; and a mount connecting said visual display and said helmet;

wherein said mount is arranged to position said helmet between said visual display and said head when said head is received within said interior with said combiner positioned to be visible through said aperture to said wearer;

said helmet is arranged substantially symmetrically about a fore-and-aft helmet plane which is substantially coplanar with a midsagittal plane of said head when said head is received within said interior;

said mount and said visual display being configured and arranged to space said combiner from said fore-and-aft helmet plane and position said combiner sufficiently close to said aperture to cause said image to be visible to one eye of said wearer but not visible to the other eye of said wearer; and said visual display and said mount have a combined center of mass and are arranged with said center of mass positioned substantially on said fore-and-aft plane.

7. A helmet and visual display assembly which provides protection for a head of a wearer of said helmet and an image for viewing by said wearer, comprising:

a helmet having an interior configured to receive said head, an exterior configured to provide protection for said head and an aperture shaped and positioned to facilitate the vision of said wearer through said helmet;

a visual display having a combiner which is partially reflective and partially transmissive, said visual display configured to generate and direct said image at said combiner, said visual display including a transmissive image generator having first and second faces and configured to form information indicia which is readable from said second face, an image illuminator configured and positioned to direct incident light upon said first face to produce transmitted light from said second face and a convergent lens positioned to process at least a portion of said transmitted light from said second face, said combiner positioned in said visual display to receive said transmitted light portion from said lens; and a mount connecting said visual display and said helmet;

wherein said mount is arranged to position said helmet between said visual display and said head when said head is received within said interior with said combiner positioned to be visible through said aperture to said wearer;

said helmet is arranged substantially symmetrically about a fore-and-aft helmet plane which is substantially coplanar with a midsagittal plane of said head when said head is received within said interior; and said visual display and said mount have a combined center of mass and are arranged with said center of mass positioned substantially on said fore-and-aft plane.

8. The assembly of claim 7, wherein said transmissive image generator includes a plurality of liquid-crystal pixels.

9. The assembly of claim 7, wherein said transmissive image generator includes an array of programmable pixels.

10. The assembly of claim 7, wherein said convergent lens has a focal length and said lens is positioned from said transmissive image generator by an optical path which is not longer than said focal length.

11. The assembly of claim 7, further including a mirror positioned to reflect said transmitted light, said mirror facilitating the positioning of said transmissive image generator to reduce the volume of said visual-display system.

12. The assembly of claim 7, further including a mirror positioned to reflect said incident light, said mirror facilitating the positioning of said radiant element to reduce the volume of said visual-display system.

13. The assembly of claim 7, wherein:
said second face has a face shape; and
said illuminator includes a radiant element which has a shape which substantially conforms with said face shape.

14. The assembly of claim 7, wherein said image illuminator further includes a diffuser positioned to diffuse said incident light.

15. The assembly of claim 7, wherein said incident light includes infrared light and said illuminator includes a heat shield positioned to block at least a portion of said infrared light.

16. A visual-display system for presenting an information display to a user of said system when said system is positioned proximate to the head of said user, comprising:
 a transmissive image generator having first and second faces and configured to form information indicia which is readable from said second face;
 a radiant element positioned to direct incident light upon said first face to produce transmitted light from said second face;
 a convergent lens positioned to process at least a portion of said transmitted light from said second face;
 a combiner positioned to receive said transmitted light portion from said lens, said combiner configured to be partially reflective and partially transmissive;
 wherein said second face has a face shape; and
 said radiant element is configured with a shape which substantially conforms with said face shape;
 said combiner reflecting to said user a virtual image of said information indicia.

17. The system of claim 16, wherein said transmissive image generator includes a plurality of liquid-crystal pixels.

18. The system of claim 16, wherein said transmissive image generator includes an array of programmable pixels.

19. The system of claim 16, wherein said convergent lens has a focal length and said lens is positioned from said transmissive image generator by an optical path which is not substantially longer than said focal length.

20. The system of claim 16, further including a diffuser positioned to diffuse said incident light.

21. The system of claim 16, wherein said incident light includes infrared light, and further including a heat shield positioned to block at least a portion of said infrared light.

22. The system of claim 16, further including a mirror positioned to reflect said transmitted light, said mirror facilitating the positioning of said transmissive image generator to reduce the volume of said visual-display system.

23. The system of claim 16, further including a mirror positioned to reflect said incident light, said mirror facilitating the positioning of said radiant element to reduce the volume of said visual-display system.

24. A helmet and visual display assembly which provides protection for a head of a wearer of said helmet and an image for viewing, by said wearer, comprising;
 a helmet having an interior configured to receive said head, an exterior configured to provide protection for said head and an aperture shaped and positioned to facilitate the vision of said wearer through said helmet;
 a visual display having a combiner which is partially reflective and partially transmissive, said visual display configured to generate and direct said image at said combiner; and
 a mount connecting said visual display and said helmet;
 N arcuately-shaped members carried by one of said helmet and said mount;
 N sockets carried by the other of said helmet and said mount, each of said sockets configured to rotatably and removably receive a different one of said arcuately-shaped members;
 wherein said mount is arranged to position said helmet between said visual display and said head when said head is received within said interior with said combiner positioned to be visible through said aperture to said wearer; and
 said helmet is configured to facilitate the forcible detachment of said visual display from said helmet.

25. The assembly of claim 24, wherein N=3.

26. A helmet and visual display assembly which provides protection for a head of a wearer of said helmet and an image for viewing by said wearer, comprising:
 a helmet having an interior configured to receive said head, an exterior configured to provide protection for said head and an aperture shaped and positioned to facilitate the vision of said wearer through said helmet;
 a visual display having a combiner which is partially reflective and partially transmissive, said visual display configured to generate and direct said image at said combiner; and
 a mount connecting said visual display and said helmet, said mount including a resilient member positioned to yieldingly permit movement between said visual display and said helmet;
 wherein said mount is arranged to position said helmet between said visual display and said head when said head is received within said interior with said combiner positioned to be visible through said aperture to said wearer; and
 said helmet is configured to facilitate the forcible detachment of said visual display from said helmet.

27. The assembly of claim 26, wherein said mount includes an energy-absorbing device positioned to dampen said movement between said visual display and said helmet.

28. A helmet and visual display assembly which provides protection for a head of a wearer of said helmet and an image for viewing by said wearer, comprising:
 a helmet having an interior configured to receive said head, an exterior configured to provide protection for said head and an aperture shaped and positioned to facilitate the vision of said wearer through said helmet;
 a visual display having a combiner which is partially reflective and partially transmissive, said visual display configured to generate and direct said image at said combiner, said image comprising information indicia,
 a mount connecting said visual display and said helmet;
 wherein said mount is arranged to position said helmet between said visual display and said head when said head is received within said interior with said combiner positioned to be visible through said aperture to said wearer, said combiner reflecting to said wearer a virtual image of said information indicia;
 said helmet is configured to facilitate the forcible detachment of said visual display from said helmet;
 wherein said helmet is arranged substantially symmetrically about a fore-and-aft helmet plane which is substantially coplanar with a midsagittal plane of said head when said head is received within said interior; and
 said visual display and said mount have a combined center of mass and are arranged with said center of mass positioned substantially on said fore-and-aft plane.

29. The assembly of claim 28, wherein said mount and said visual display are configured and arranged to space said combiner from said helmet plane and position said combiner sufficiently close to said aperture to cause said combiner to be visible to one eye of said wearer but not visible to the other eye of said wearer.

* * * * *